United States Patent
Gassen et al.

(10) Patent No.: US 10,254,025 B2
(45) Date of Patent: Apr. 9, 2019

(54) REFRIGERATING SYSTEM AND METHOD FOR CONTROLLING THE SAME

(75) Inventors: Heinz Gassen, Sinzig (DE); Peter Leweke, Wesseling (DE)

(73) Assignee: Carrier Corporation, Jupiter, FL (US)

(*) Notice: Subject to any disclaimer, the term of this patent is extended or adjusted under 35 U.S.C. 154(b) by 1996 days.

(21) Appl. No.: 12/682,440

(22) PCT Filed: Oct. 10, 2007

(86) PCT No.: PCT/EP2007/008818
§ 371 (c)(1),
(2), (4) Date: Jul. 12, 2010

(87) PCT Pub. No.: WO2009/046740
PCT Pub. Date: Apr. 16, 2009

(65) Prior Publication Data
US 2010/0300126 A1    Dec. 2, 2010

(51) Int. Cl.
*F25B 1/00* (2006.01)
*F25B 41/04* (2006.01)
(Continued)

(52) U.S. Cl.
CPC ............ *F25B 41/062* (2013.01); *F25B 9/008* (2013.01); *F25B 2309/061* (2013.01);
(Continued)

(58) Field of Classification Search
CPC ........ F25B 1/00; F25B 41/00; F25B 41/4104; F25B 41/49; F25B 41/04
(Continued)

(56) References Cited

U.S. PATENT DOCUMENTS 4,402,183 A * 9/1983 Dimitroff et al. .............. 60/660
4,966,006 A * 10/1990 Thuesen et al. ................ 62/89
(Continued)

FOREIGN PATENT DOCUMENTS

JP        1163694 A  *  3/1999
JP     2001133058 A  *  5/2001  ............... F25B 1/00
(Continued)

*Primary Examiner* — Christopher R Zerphey
*Assistant Examiner* — Harry Arant
(74) *Attorney, Agent, or Firm* — O'Shea Getz P.C.

(57) ABSTRACT

A refrigerating system according to the invention includes a refrigerant circuit having at least one compressor, a condenser/gascooler, an intermediate pressure container, at least one evaporator and a respective expansion device before said at least one evaporator, and refrigerant pipes connecting said elements and circulating a refrigerant therethrough; a high pressure regulating device between the condenser/gascooler and the intermediate pressure container, expanding the refrigerant from a high pressure level to an intermediate pressure level; an intermediate pressure sensor sensing the intermediate pressure level; and a control unit controlling the high pressure regulating device. The control unit in operation limits the maximum refrigerant flow through the high pressure regulating device to a maximum flow value $F_{Max}$ if the sensed intermediate pressure level exceeds a predetermined threshold value $P_{IntTh}$.

13 Claims, 2 Drawing Sheets

(51) Int. Cl.
*F25B 41/06* (2006.01)
*F25B 9/00* (2006.01)

(52) U.S. Cl.
CPC ..... *F25B 2341/063* (2013.01); *F25B 2400/13* (2013.01); *F25B 2400/23* (2013.01); *F25B 2600/17* (2013.01); *F25B 2700/19* (2013.01)

(58) Field of Classification Search
USPC ...... 62/189, 217, 115, 228.3, 216, 174, 512, 62/222, 196.2; 702/98, 100
See application file for complete search history.

(56) References Cited

U.S. PATENT DOCUMENTS

| | | | |
|---|---|---|---|
| 5,647,961 A * | 7/1997 | Lofland | 203/2 |
| 6,250,099 B1 | 6/2001 | Furuya et al. | |
| 6,385,980 B1 * | 5/2002 | Sienel | 62/174 |
| 2004/0031280 A1 * | 2/2004 | Martin et al. | 62/246 |
| 2006/0277932 A1 | 12/2006 | Otake et al. | |
| 2006/0288732 A1 * | 12/2006 | Komatsu et al. | 62/498 |

FOREIGN PATENT DOCUMENTS

| | | | |
|---|---|---|---|
| JP | 2002162133 A * | | 6/2002 |
| JP | 2005214442 | | 8/2005 |
| WO | 9910686 | | 3/1999 |
| WO | WO 2006087005 A1 * | | 8/2006 |
| WO | WO 2008/039204 | * | 4/2008 |
| WO | WO 2008130357 | * | 10/2008 |

\* cited by examiner

REFRIGERATING SYSTEM AND METHOD FOR CONTROLLING THE SAME

This application is entitled to the benefit of, and incorporates by reference essential subject matter disclosed in PCT Application No. PCT/EP2007/008818 filed on Oct. 10, 2007.

BACKGROUND OF THE INVENTION

1. Technical Field

The invention relates to a refrigerating system and to a method for controlling a refrigerating system.

2. Background Information

Refrigerating systems using $CO_2$ as a refrigerant are well known in the art. It is also known that, in these systems, the refrigerant coming from the condenser/gascooler is expanded to an intermediate pressure level via a throttle valve, before being expanded further by a further throttle valve before an evaporator. The refrigerant pressure in the condenser/gascooler is commonly regulated by setting the degree of aperture of said valve between the condenser/gascooler and the intermediate pressure part of the system. For example, in the case of a pressure in the condenser/gascooler exceeding a reference pressure value, the pressure is released via said valve. This can lead to an increase of the intermediate pressure level over a critical value, such that the refrigerant has to be released into the environment via safety valves. This loss of refrigerant will lead to a performance reduction of the refrigerating system and can cause damage to the system.

Accordingly, it would be beneficial to provide a refrigerating system having an increased performance and durability.

SUMMARY OF THE INVENTION

Exemplary embodiments of the invention include a refrigerating system including a refrigerant circuit having at least one compressor, a condenser/gascooler, an intermediate pressure container, at least one evaporator and a respective expansion device before said at least one evaporator, and refrigerant pipes connecting said elements and circulating a refrigerant therethrough; a high pressure regulating device between the condenser/gascooler and the intermediate pressure container, expanding the refrigerant from a high pressure level to an intermediate pressure level; an intermediate pressure sensor sensing the intermediate pressure level; and a control unit controlling the high pressure regulating device. The control unit limits in operation the maximum refrigerant flow through the high pressure regulating device to a maximum flow value $F_{Max}$ if the sensed intermediate pressure level exceeds a predetermined threshold value $P_{IntTh}$.

Exemplary embodiments of the invention further include a method for controlling a refrigerating system comprising a refrigerant circuit having at least one compressor, a condenser/gascooler, an intermediate pressure container, at least one evaporator and a respective expansion device before said at least one evaporator, and refrigerant pipes connecting said elements and circulating a refrigerant therethrough; a high pressure regulating device between the condenser/gascooler and the intermediate pressure container, expanding the refrigerant from a high pressure level to an intermediate pressure level; and an intermediate pressure sensor sensing the intermediate pressure level; the method comprising the step of controlling the high pressure regulating device by limiting the maximum refrigerant flow through the high pressure regulating device to a maximum flow value $F_{Max}$ if the sensed intermediate pressure level exceeds a predetermined threshold value $P_{IntTh}$.

Embodiments of the invention are described in greater detail below with reference to the figures, wherein:

DETAILED DESCRIPTION OF THE INVENTION

Figure 1:
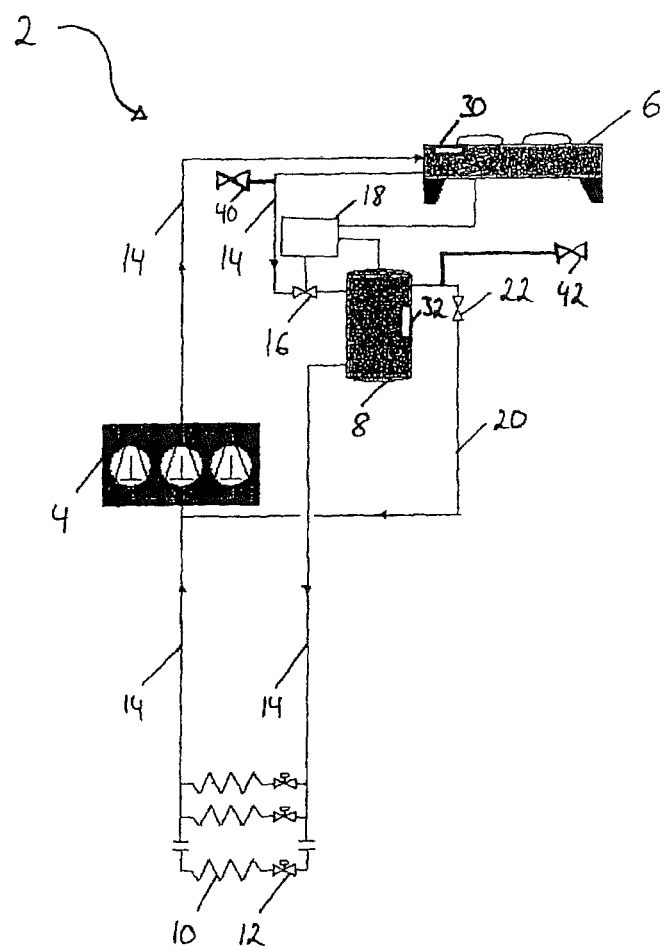
FIG. 1 shows a schematic of an exemplary refrigerant circuit in accordance with the present invention.

FIG. 1 shows a refrigerant circuit 2 in accordance with an embodiment of the present invention. The refrigerant circuit 2 includes the four standard components of refrigerating circuits: a compressor 4, a condenser/gascooler 6, an expansion device 12, and an evaporator 10. In the embodiment shown the refrigerant circuit 2 comprises a set of three compressors 4 and three evaporators 10, with expansion devices 12 associated respectively. The elements mentioned are connected by refrigerant pipes 14. The refrigerant circuit 2 of FIG. 1 also comprises an intermediate pressure container 8 and a high pressure regulating device 16, which is located between the condenser/gascooler 6 and the intermediate pressure container 8.

This high pressure regulating device 16 allows for a controlled release of pressure from the condenser/gascooler 6 to the intermediate pressure container 8. For this purpose the flow through the high pressure regulating device 16 is set. The flow can be set by adjusting the degree of aperture of the high pressure regulating device 16. The high pressure regulating device 16 may be a regulating valve. As a matter of course, any other device known to the skilled person to be appropriate for the above described regulating operation may be used as well.

If the refrigerant circuit 2 is operated at relatively high pressure in the refrigerant pipe between the set of compressors 4 and the condenser/gascooler 6, the refrigerant reaches a transcritical region. In this transcritical operation, the condenser 6 works as a gascooler. In the following the term "condenser" shall be understood as to include both the meaning of condenser and gascooler.

A control unit 18 controls said high pressure regulating device 16, and it is connected to a high pressure sensor 30 arranged at the condenser 6 and to an intermediate pressure sensor 32 at the intermediate pressure container 8 sensing the intermediate pressure level in order to provide the control unit 18 with a momentary intermediate pressure value $P_{Int}$.

The intermediate pressure sensor may be located somewhere in the intermediate pressure portion of the refrigerant circuit 2, i.e. in the pipe between the high pressure regulating device 16 and the intermediate pressure container 8, in the intermediate pressure container 8, or in the pipe between the intermediate pressure container 8 and the at least one expansion device 12 before the at least one evaporator 10. In the embodiment of FIG. 1, the intermediate pressure sensor is located in the intermediate pressure container 8, preferable in a vicinity of the outlet, from where the refrigerant pipe 14 carries the refrigerant towards the evaporator 10.

The high pressure sensor, which senses the high pressure level, may be located somewhere in the high pressure portion of the refrigerant circuit 2. In the embodiment of FIG. 1 the high pressure sensor is located in the condenser 6. Said high pressure sensor can either measure the pressure directly or deduce the pressure from the exit temperature of the condenser 6.

FIG. 1 additionally shows a gaseous refrigerant refeed pipe 20 connecting the gas space of the intermediate pressure container 8 to the suction line of the set of compressors 4. Associated therewith, preferably arranged within the refeed pipe 20, is an intermediate pressure regulating device 22. As the intermediate pressure container 8 in operation separates liquid refrigerant from gaseous refrigerant, the gaseous refrigerant refeed pipe 20 is adapted to carry said gaseous refrigerant away from said intermediate pressure container 8. Having this refeed pipe 20 in place and controlling the intermediate pressure regulating device 22 accordingly allows for keeping the intermediate pressure level constant, which increases efficiency of the refrigerating system. Expansion devices 12 and evaporators 10 operate better when fed by constant pressure from intermediate pressure container 8. The gaseous refrigerant is fed back from the intermediate pressure container 8 to the input side of the at least one compressor 4.

Figure 2:
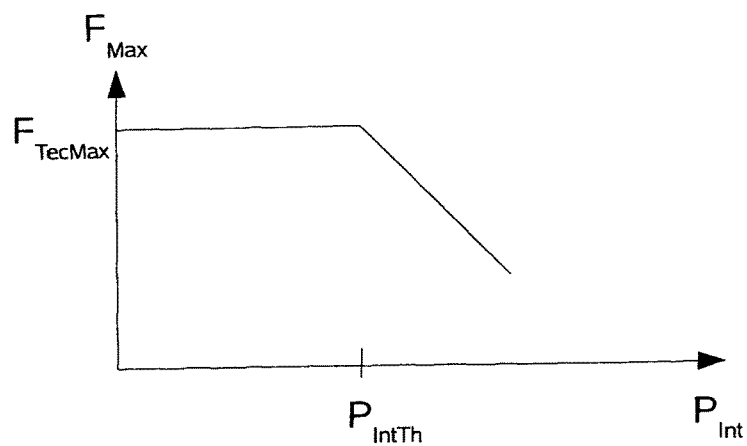
FIG. 2 shows an exemplary function of the maximum allowable flow through the high pressure regulating device depending on the intermediate pressure level.

FIG. 2 shows an exemplary function of the maximum allowable flow $F_{max}$ through the high pressure regulating device 16 depending on the intermediate pressure level $P_{Int}$.

The axes of the graph of FIG. 2 represent the intermediate pressure level $P_{Int}$ and the maximum allowable flow $F_{Max}$.

The course of the maximum allowable flow $F_{Max}$ is constant for an intermediate pressure level $P_{Int}$ up to a threshold value $P_{IntTh}$ and decreases in a linear manner with a further increase of the intermediate pressure level $P_{Int}$.

The shown dependency can be expressed with the formula:

$$F_{Max} = F_{TecMax}(1 - C_P(P_{Int} - P_{IntTh})),$$

wherein $F_{TecMax}$ is the maximum flow the high pressure regulating device 16 technically supports and $C_P$ is a proportionality constant.

Figure 3:
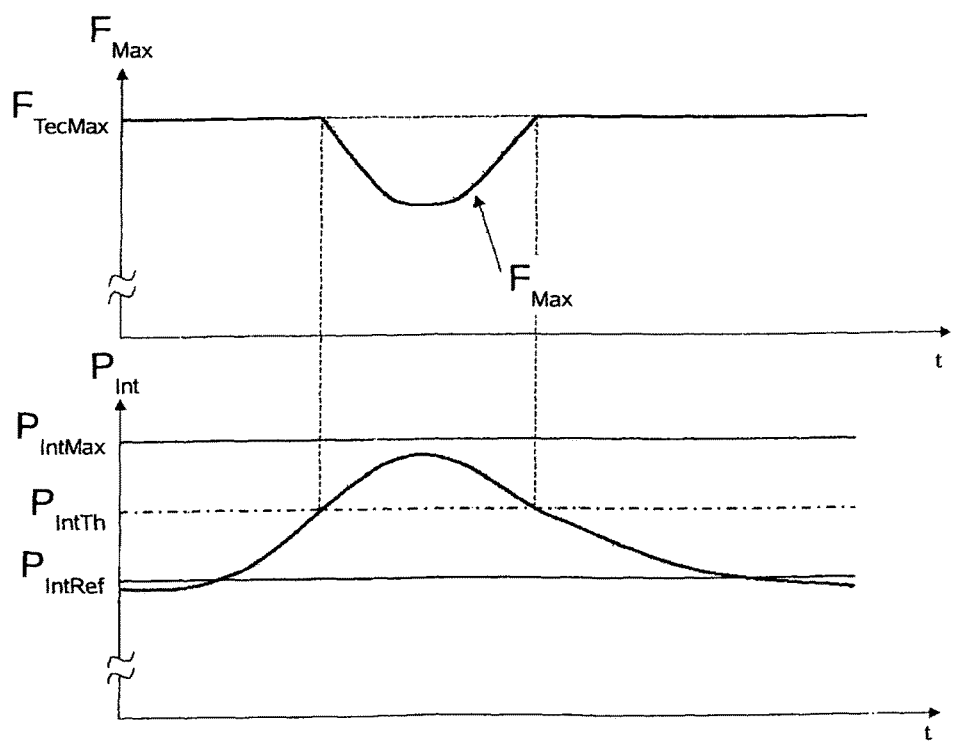
FIG. 3 shows an exemplary course of the intermediate pressure level and the maximum allowable flow through the high pressure regulating device over time.

FIG. 3 shows two synchronized graphs, the upper graph depicting an exemplary course of the maximum allowable flow $F_{Max}$ through the high pressure regulating device 16 over time as calculated by the control unit 18, and the lower graph depicting a corresponding course of the intermediate pressure level $P_{Int}$ over time.

The intermediate pressure level $P_{Int}$ increases starting below a reference intermediate pressure value $P_{IntRef}$, it exceeds the threshold value $P_{IntTh}$, and it reaches its peak lying below the maximum allowable intermediate pressure value $P_{IntMax}$. Then the intermediate pressure level $P_{Int}$ decreases, finally reaching a value around the reference intermediate pressure value $P_{IntRef}$.

The maximum allowable flow $F_{Max}$ through the high pressure regulating device 16 is constant at the maximum technically possible flow value $F_{TecMax}$, when the intermediate pressure level $P_{Int}$ is below the threshold value $P_{IntTh}$, and decreases in proportion to the amount the intermediate pressure level $P_{Int}$ exceeds the threshold value $P_{IntTh}$, and it increases again with falling intermediate pressure level $P_{Int}$.

The control of the refrigerating system according to exemplary embodiments of the invention is explained as follows.

The intermediate pressure level $P_{Int}$ is used as an input to the control unit 18. Based on the intermediate pressure level $P_{Int}$, the control unit 18 calculates a maximum tolerable flow $F_{Max}$ through or a maximum allowable degree of aperture of the high pressure regulating device 16. This makes the release of pressure from the high pressure level, i.e. the pressure level in the condenser 6 and before the high pressure regulating device 16, dependent on the intermediate pressure level $P_{Int}$. The control unit 18 sets a maximum tolerable flow value $F_{Max}$ once the intermediate pressure level exceeds $P_{Int}$ a preset threshold value $P_{IntTh}$; i.e. the control unit 18 allows a refrigerant flow through expansion device 16 as high as technically possible under the momentary system conditions, as long as the intermediate pressure level $P_{Int}$ stays below said predetermined threshold value $P_{IntTh}$. This behavior takes into account that a release of pressure from the condenser 6 into the intermediate pressure container 8 does not affect the safety of the system in the intermediate pressure region, as long as the threshold value $P_{IntTh}$ for the intermediate pressure level $P_{Int}$ is not reached.

In the exemplary embodiment, the threshold value $P_{IntTh}$ is set to be between a reference intermediate pressure value $P_{IntRef}$ and a critical intermediate pressure level, herein also referred to as maximum allowable intermediate pressure value $P_{IntMax}$. This allows for no restriction of the flow through the high pressure regulating device 16 due to the intermediate pressure level $P_{Int}$, as long as said intermediate pressure level $P_{Int}$ is around the desired reference value $P_{IntRef}$. In case the intermediate pressure level $P_{Int}$ leaves the region around the reference intermediate pressure value $P_{IntRef}$ and moves towards a critical intermediate pressure level, the limiting operation by the control unit 18 kicks in. A threshold value $P_{IntTh}$ lying between a fourth and a half, particularly around a third, of the range from the reference intermediate pressure value $P_{IntRef}$ to the maximum allowable intermediate pressure value $P_{IntMax}$ is used in the exemplary embodiment.

As discussed above, the maximum refrigerant flow through the high pressure regulating device 16 is limited by the control unit 18, in case a threshold value $P_{IntTh}$ is exceeded by the intermediate pressure level $P_{Int}$. In the exemplary embodiment, the more the intermediate pressure level $P_{Int}$ exceeds the threshold value $P_{IntTh}$, the more restrictive is the limit imposed on the refrigerant flow through the high pressure regulating device 16 by the control unit 18. In combination with refrigerant constantly leaving the intermediate pressure portion of the refrigerant circuit 2 through the expansion devices 12 and the intermediate pressure regulating device 22, a slight reduction of the maximum tolerable flow $F_{Max}$ may suffice to stop a further increase in or reduce the intermediate pressure level $P_{Int}$ when only slightly exceeding the threshold value $P_{IntTh}$. For a further increased intermediate pressure level $P_{Int}$, the reduction of the maximum tolerable flow $F_{Max}$ is increased as well. Up until the threshold value $P_{IntTh}$ the maximum tolerable flow $F_{Max}$ is at a 100% of the flow that is technically possible under the momentary system conditions. With the intermediate pressure level $P_{Int}$ exceeding the threshold value $P_{IntTh}$, the maximum tolerable flow $F_{Max}$ is decreased in a linear manner with a further increase of the intermediate pressure level $P_{Int}$, as illustrated in FIG. 2.

The proportionality constant $C_P$ determines the slope of the decreasing portion of the function depicted in FIG. 2. $C_P$ can be chosen according to the desired control behavior. If, for example, a complete closure of the high pressure regulating device 16 is wanted when the critical intermediate pressure level is reached, $C_P$ is dimensioned, such that the product of $C_P$ and $(P_{IntMax} - P_{IntTh})$ equals to one. $C_P$ can also be chosen larger, in order to prevent reaching of the critical intermediate pressure level, since the high pressure regulating device 16 is shut down completely before the critical intermediate pressure level is reached. $C_P$ can also be chosen smaller, in order to make the control of the refrigerant flow through the high pressure regulating device 16 less restrictive, which will allow for more efficient release of pressure from the condenser 6.

The proportionality constant $C_P$ does not necessarily have a fixed value. It can be adjusted when installing the refrigerating system, taking into account operating conditions, such as location, operation environment, etc. An adjustment of $C_P$ can also be used to compensate for changes in the environment of the control unit 18 during the lifespan of the refrigerating system, so that the whole system does not necessarily have to be recalibrated.

As can be seen from the two graphs of FIG. 3, the maximum tolerable flow $F_{Max}$ is the maximum technically possible flow value $F_{TecMax}$, as long as the intermediate pressure level $P_{Int}$ stays below the threshold value $P_{IntTh}$, i.e. in a region around the reference intermediate pressure value $P_{IntRef}$. As soon as the intermediate pressure level $P_{Int}$ exceeds the predetermined threshold value $P_{IntTh}$, the maximum allowable flow $F_{Max}$, which is set by the control unit 18, is decreased. The mapping of the intermediate pressure level $P_{Int}$ onto the maximum allowable flow $F_{Max}$, which is the basis for creating the maximum flow curve as shown in the upper graph of FIG. 3, is done using a function of the sort of the function depicted in FIG. 2.

Instead of the function depicted in FIG. 2 a plurality of other functions may be used to map the intermediate pressure level $P_{Int}$ onto the maximum flow value $F_{Max}$ through the high pressure regulating device 16. For example, a step function can be thought of, in which a plurality of additional threshold values exists, which are greater than $P_{IntTh}$. For each of the threshold values, the maximum tolerable flow $F_{Max}$ is decreased by a discrete value. This will result in a monotonically decreasing, step-like function. Also, one may think of a logarithmic decrease of the maximum tolerable flow $F_{Max}$ with the intermediate pressure level $P_{Int}$ increasing beyond the threshold value $P_{IntTh}$, which allows for a slight reduction in the maximum tolerable flow $F_{Max}$ for values of the intermediate pressure level $P_{Int}$ exceeding the threshold value $P_{IntTh}$ by only a little bit and a more and more drastic reduction the more the intermediate pressure level $P_{Int}$ exceeds the threshold value $P_{IntTh}$. From the previous examples it is apparent to a person skilled in the art that there are many options for functions that may be used by the control unit 18 to calculate the maximum flow value $F_{Max}$.

In the embodiment shown in FIG. 1, control unit 18 not only sets the maximum flow value $F_{Max}$ and controls the high pressure regulating device 16 accordingly, but also calculates the desired actual flow value through high pressure regulating device 16 and controls said device accordingly. This could also be done by separate controls. For example one control could limit the degree of aperture of a regulating valve employing a stopping mechanism, whereas a second control is responsible for actually changing the degree of aperture. However, in the present embodiment the functionality is combined in a single control unit 18.

The actual flow through high pressure regulating device 16, which can not exceed the maximum flow value $F_{Max}$ calculated by control unit 18, is set by control unit 18 dependent on the high pressure level. The high pressure level is obtained by the high pressure sensor. By controlling the high pressure regulating device 16 depending on the high pressure level, the high pressure level is regulated in order to achieve a desired cooling of the refrigerant in the condenser 6.

In order to avoid pressure levels that are possibly damaging to the refrigerating system, the high pressure portion as well as the intermediate pressure portion of the refrigerant circuit 2 may comprise respective safety valves 40 and 42. For the high pressure portion of the refrigerant circuit 2, the safety valve may release pressure in case the pressure release through the high pressure regulating device 16 is not sufficient. For the intermediate pressure portion, an insufficient pressure release through the intermediate pressure regulating device 22 or the expansion devices 12 can be compensated by the safety valve structure. High pressure portion as well as intermediate pressure portion may comprise one or a plurality of safety valves. Possibly damaging or in any other way critical pressure values may thereby be prevented.

Other measures may alternatively or in addition be taken to prevent the high pressure level from reaching a critical level. When approaching a critical pressure value in the high pressure portion, the flow limiting control through the high pressure regulating device 16, carried out by control unit 18, may be suspended. In other words, a critical scenario in the high pressure portion of the refrigerating circuit 2 may override the flow limit set depending on the intermediate pressure level $P_{Int}$.

Also, for the high pressure level approaching a critical value, the performance of the compressor 4 may be degraded or one of a plurality of compressors 4 may be switched off. This allows for an overall pressure release in the refrigerating circuit 2.

In an embodiment of the invention, $CO_2$ is used as a refrigerant. When using $CO_2$, typical pressure values are 50-100 bar for the high pressure level, 30-40 bar for the intermediate pressure level $P_{Int}$, and 20-35 bar for the portion between the evaporator and the input to the compressor. The high pressure safety valve may open between 115-120 bar, whereas the intermediate pressure safety valve may open at approximately 40 bar. As a matter of course any other refrigerant known to the skilled person may be used as well.

Exemplary embodiments of the invention, as described above, allow for limiting the flow through the high pressure regulating device dependent on the intermediate pressure level $P_{Int}$, thus avoiding the intermediate pressure level $P_{Int}$ to reach a critical intermediate pressure level. Therefore they allow for preventing an otherwise occasionally necessary release of refrigerant from the intermediate pressure portion of the refrigerant circuit into the environment via safety valves. The exemplary embodiments furthermore allow for providing a structure for a control that bases its regulating operation on both the high and the intermediate pressure level. This coupling of high pressure regulation and intermediate pressure regulation leads to a greater overall system efficiency, safety, and durability.

As described above, the predetermined threshold value $P_{IntTh}$ may be between a reference intermediate pressure value $P_{IntRef}$ and a maximum allowable intermediate pressure value $P_{IntMax}$. This allows for the possibility of a not limited pressure release from the high pressure level to the intermediate pressure level $P_{Int}$, as long as the intermediate pressure level $P_{Int}$ is around a predetermined reference intermediate pressure value $P_{IntRef}$. It also allows for the flow limiting operation to set in before a critical intermediate pressure value is reached. More particularly, the predetermined threshold value $P_{IntTh}$ can be set according to the formula $P_{IntTh}=P_{IntRef}+C_{Th}(P_{IntMax}-P_{IntRef})$, wherein $C_{Th}$ is a constant lying between 0.25 and 0.5.

It is possible for the control unit in operation to set a maximum flow value $F_{Max}$ using a monotonically decreasing function of the intermediate pressure level $P_{Int}$. The flow through the high pressure regulating device, which increases the intermediate pressure level $P_{Int}$, is thereby more and more limited, the more the intermediate pressure level $P_{Int}$ increases from the threshold value $P_{IntTh}$ towards the maximum allowable intermediate pressure value $P_{IntMax}$. The flow can be decreased gradually in a linear fashion, when the maximum flow value $F_{Max}$ is set according to the formula $F_{Max}=F_{TecMax}(1-C_P(P_{Int}-P_{IntTh}))$, wherein $F_{TecMax}$ is the maximum flow the high pressure regulating device technically supports and $C_P$ is a proportionality constant. The proportionality constant $C_P$ can be adaptable to adjust the refrigerating system to various operating conditions. This allows for adjusting the refrigerating system to its location and environment, particularly upon installation. It also provides means for additional adjustments throughout the lifespan of the system.

The refrigerant circuit can additionally comprise a high pressure sensor sensing the high pressure level. This allows for additional control options for the high pressure regulating device. These additional control measures may be implemented in the control unit. It is possible that the control unit in operation sets the refrigerant flow through the high pressure regulating device to an actual flow value based on the sensed high pressure level under the condition that the maximum flow value $F_{Max}$ is not exceeded. Thereby an unwanted release of pressure from the high pressure level can be prevented in order to build up the high pressure level to a reference value.

It is also possible that the refrigerant flow through the high pressure regulating device is adjusted by changing the degree of aperture thereof. Control of the degree of aperture of the regulating device, for example a regulating valve, directly controls the flow.

As explained above, the intermediate pressure container may in operation separate liquid refrigerant from gaseous refrigerant. The refrigerant circuit may comprise a gaseous refrigerant refeed pipe connecting a gas space of the intermediate pressure container with the at least one compressor and an intermediate pressure regulating device arranged within the gaseous refrigerant refeed pipe. This allows for the gaseous refrigerant being carried away from the intermediate pressure container towards the inlet of the at least one compressor, bypassing the at least one expansion device and the at least one evaporator, through which liquid refrigerant is flown.

It is furthermore possible that the condenser and the intermediate pressure container each have at least one safety valve associated therewith, the safety valves being adapted to release refrigerant when the pressure reaches a critical level in the respective parts of the refrigerating system. This allows for having an emergency system in place, in case critical values of the high pressure level and/or the intermediate pressure level $P_{Int}$ can not be sufficiently controlled by the high pressure regulating device and the intermediate pressure regulating device, respectively.

Moreover, it is possible in case of the high pressure level approaching a critical value that the control unit stops limiting the maximum refrigerant flow $F_{MS}$ through the high pressure regulating device. Additionally/alternatively in case of the high pressure level approaching a critical value, the control unit may subsequently switch off compressor stages of the at least one compressor. These measures allow for alleviating the high pressure level without making use of the drastic measure of opening the safety valves.

As mentioned before, the refrigerant may be $CO_2$.

With the method for controlling a refrigerating system according to exemplary embodiments of the invention, as described above, the same advantages can be attained as with the refrigerating system. This method can be developed further by method steps corresponding to the features as described with regard to the refrigerating system. In order to avoid redundancy such embodiments and developments of the method for controlling a refrigerating system are not repeated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. Refrigerating system having a refrigerant circuit comprising:
   at least one compressor, a condenser/gascooler, an intermediate pressure container, at least one evaporator and a respective expansion device before said at least one evaporator, and refrigerant pipes connecting said elements and circulating a refrigerant therethrough;
   a high pressure regulating device between the condenser/gascooler and the intermediate pressure container, expanding the refrigerant from a high pressure level to an intermediate pressure level;
   an intermediate pressure sensor sensing the intermediate pressure level; and
   a control unit controlling the high pressure regulating device;
   wherein the control unit is configured to set a maximum flow value $F_{Max}$ as a limit for a refrigerant flow through the high pressure regulating device,
   wherein the control unit is configured to compare the sensed intermediate pressure level to a fixed predetermined threshold value $P_{IntTh}$, wherein the predetermined threshold value $P_{IntTh}$ is between a fixed reference intermediate pressure value $P_{IntRef}$ being the desired operating point of the intermediate pressure level, and a maximum allowable intermediate pressure value $P_{IntMax}$,
   wherein the control unit is configured, as a function of said comparison of the sensed intermediate pressure level to the predetermined threshold value $P_{IntTh}$, to set the maximum flow value $F_{Max}$ to less than a maximum flow value $F_{TecMax}$ that the high pressure regulating device technically supports,
   wherein the refrigerant circuit additionally comprises a high pressure sensor sensing the high pressure level, wherein the control unit is configured to set a desired actual flow value for the refrigerant flow through the high pressure regulating device based on the sensed high pressure level, wherein the desired actual flow value does not exceed the maximum flow value $F_{Max}$.

2. Refrigerating system according to claim 1, wherein the predetermined threshold value $P_{IntTh}$ is set according to the formula:

$$P_{IntTh} = P_{IntRef} + C_{Th}(P_{IntMax} - P_{IntRef}),$$

wherein $C_{Th}$ is a constant lying between 0.25 and 0.5.

3. Refrigerating system according to claim 1, wherein the control unit in operation sets the maximum flow value $F_{Max}$ using a monotonically decreasing function of the intermediate pressure level $P_{Int}$.

4. Refrigerating system according to claim 3, wherein the maximum flow value $F_{Max}$ is set according to the formula:

$$F_{Max} = F_{TecMax}(1 - C_P(P_{Int} - P_{IntTh})),$$

wherein $C_P$ is a proportionality constant.

5. Refrigerating system according to claim 4, wherein the proportionality constant $C_P$ is adaptable to adjust the refrigerating system to various operating conditions.

6. Refrigerating system according to claim 1, wherein the refrigerant flow through the high pressure regulating device is adjusted by changing a degree of aperture thereof.

7. Refrigerating system according to claim 1, wherein the intermediate pressure container in operation separates liquid refrigerant from gaseous refrigerant.

8. Refrigerating system according to claim 7, wherein the refrigerant circuit also comprises a gaseous refrigerant refeed pipe connecting a gas space of the intermediate pressure container with the at least one compressor and an intermediate pressure regulating device arranged within the gaseous refrigerant refeed pipe.

9. Refrigerating system according to claim 1, wherein the condenser/gascooler and the intermediate pressure container each have at least one safety valve associated therewith, the safety valves being adapted to release refrigerant when a pressure reaches a critical level in the respective elements of the refrigerating system.

10. Refrigerating system according to claim 1, wherein, in case of the high pressure level approaching a critical value, the control unit stops limiting the refrigerant flow to the maximum refrigerant flow $F_{Max}$.

11. Refrigerating system according to claim 1, wherein, in case of the high pressure level approaching a critical value, the control unit subsequently switches off compressor stages of the at least one compressor.

12. Refrigerating system according to claim 1, wherein the refrigerant is $CO_2$.

13. Method for controlling a refrigerating system comprising a refrigerant circuit having at least one compressor, a condenser/gascooler, an intermediate pressure container, at least one evaporator and a respective expansion device before said at least one evaporator, and refrigerant pipes connecting said elements and circulating a refrigerant therethrough; a high pressure regulating device between the condenser/gascooler and the intermediate pressure container, expanding the refrigerant from a high pressure level to an intermediate pressure level; an intermediate pressure sensor sensing the intermediate pressure level; and a high pressure sensor sensing the high pressure level;

the method comprising the steps of:

comparing the sensed intermediate pressure level to a fixed predetermined threshold value $P_{IntTh}$, wherein the predetermined threshold value $P_{IntTh}$ is between a fixed reference intermediate pressure value $P_{IntRef}$, being the desired operating point of the intermediate pressure level and a maximum allowable intermediate pressure value $P_{IntMax}$;

on the basis of said step of comparing the sensed intermediate pressure level to the predetermined threshold value $P_{IntTh}$, setting a maximum flow value $F_{Max}$, which maximum flow value is set to less than a maximum flow value $F_{TecMax}$ that the high pressure regulating device technically supports, limiting a refrigerant flow through the high pressure regulating device to the maximum flow value $F_{Max}$, and setting a desired actual flow value for the refrigerant flow through the high pressure regulating device based on the sensed high pressure level, wherein the desired actual flow value does not exceed the maximum flow value $F_{Max}$.

* * * * *